United States Patent [19]

Butkovich et al.

[11] Patent Number: 4,585,164
[45] Date of Patent: Apr. 29, 1986

[54] PORTABLE ENERGY LEVEL CONTROL SYSTEM

[76] Inventors: Joseph J. Butkovich, 4107 Thomas St., Oceanside, Calif. 92056; Robert A. Buchaklian, Jr., 6685 Archwood Ave., San Diego, Calif. 92120; Gregory Campbell, 12131 Caminito Campana, San Diego, Calif. 92128

[21] Appl. No.: 653,298

[22] Filed: Sep. 24, 1984

[51] Int. Cl.[4] .......................................... G05D 23/00
[52] U.S. Cl. ....................................... 236/51; 364/187
[58] Field of Search .......... 236/51, 1 R, 1 B, DIG. 2; 165/26, 22, 27; 364/187, 557; 371/62, 66, 65; 340/870.17, 870.19, 870.20, 870.23, 870.24

[56] References Cited

U.S. PATENT DOCUMENTS

| | | | |
|---|---|---|---|
| 4,186,873 | 2/1980 | Geisler et al. | 236/51 X |
| 4,333,316 | 6/1982 | Stamp, Jr. et al. | 165/26 X |
| 4,336,902 | 6/1982 | Neal | 236/51 X |
| 4,479,604 | 10/1984 | Didner | 165/22 X |

FOREIGN PATENT DOCUMENTS 0092640  6/1982  Japan ..................................... 236/51

Primary Examiner—Harry Tanner
Attorney, Agent, or Firm—John J. Murphey

[57] ABSTRACT

A control for interior environmental energy system comprising a portable thermostat comprising a temperature indicator, an electromagnetic pulse transmitter and means to trigger the pulse transmitter with a coded "on" and a coded "off" pulse in response to the temperature in the room where the thermostat is located, an actuator unit in communication with the energy unit that contains means for receiving said energy pulses and relaying them to the energy system and that is latched into a stabilized on or off position through repeated receipt of the specific codes and a fail safe system that either closes down the control or transfers control to conventional built-in controller upon failure to receive coded pulses over a specific time period.

8 Claims, 2 Drawing Figures

PORTABLE ENERGY LEVEL CONTROL SYSTEM

FIELD OF THE INVENTION

This invention pertains to environmental control. More particularly, it pertains to remote management of environmental energy systems be it heating, cooling or humidity loops, for isolated portions of the interior of a structure. Essentially, this invention provides for management of an energy system, for instance, the temperature in an isolated portion of a small structure, e.g., a home, where the system is conventionally controlled from a central room, wall-mounted thermostat.

BACKGROUND OF THE INVENTION

Since the advent of central heat, homes have been heated and cooled with furnaces and air conditioning units remote to the living quarters through use of a temperature sensing unit (a "thermostat") mounted on a wall in the living area such as the living room, dining room, etc. No method exists for controlling the temperature in any room remote to the thermostated room other than setting the thermostat temperature at a higher or lower value. While some control is achieved this way, other rooms suffer too high or too low temperatures thereby incurring energy waste.

When energy costs began to rise significantly, efforts were made to reduce consumption along two fronts. In commercial establishments computerized controls were installed that interrelated demand, consumption and costs values. Specific equipment was programmed to turn on or off in relation to demand as a function involving peak utility rates to achieve the desired temperature at a lower overall cost. In homes, with one furnace and one air conditioner, such technology could not be used thus the only method of achieving reduced energy consumption was to set the temperature of the thermostat to a lower value, lower at night than during the day.

While young people can tolerate reduced warmth and lessened air conditioning, many other persons are not so fortunate. For them, a constant temperature is vitally necessary to their prolonged health and such temperature control reductions mean the onset of colds, flu and other maladies. Some effort has been made to control temperature in remote rooms by shutting off heat ducts to various unused rooms to isolate the energy system and thus reduce demand and load. The overriding problem with this procedure is that the thermostat must still be set at a fictitious temperature so that the desired temperature is achieved in the remote room and this fictitious temperature forces the energy system, i.e., the furnace, to consume unneeded and very costly energy.

The prior art is not filled with much achievement in management of home energy sytems. Attempts to date include remote controlling of furnaces using RF (radio frequency) circuitry (Isaacs, et al U.S. Pat. No. 3,605,877); remote control of furnaces using oscillator circuits controlling the magnitude of the signal as well as the energizing thereof (Machlet U.S. Pat. No. 2,764,355); superimposing an RF signal over current line to control humidifier circuit in remote area (Geister, et al U.S. Pat. No. 4,186,873); alarm for system shut down capable of interpretation between emergencies and less critical malfunctions (Henkel U.S. Pat. No. 3,007,320); superimposing pulses on the power line to actuate various energy systems within a large, multi-temperature structure (Cleary, et al U.S. Pat. No. 4,132,355) and computerized systems for initial installation involving a plurality of sensors, a multiphased temperature program integrated into a pre-planned workload and controlling computer ("Energy Saver" programmable thermostat from M-C Products, Division of Material Control, Inc., 7720 E. Redfield Rd., Suite 2, Scottsdale, Ariz. 85260). All of these devices are complicated, require substantial operator knowhow and involvement, and are generally beyond the intellect and the financial means of most homeowners.

With respect to the Isaacs patent, the system is based upon providing an activation signal from a radio frequency transmitter that is coupled to a thermostat or other sensor through a first timing device, for receipt by an RF receiver on a furnace or other device to energize the furnace, the signal being adapted to be retransmitted periodically via the timer, the whole system being programmed through a second timer to shut down in the absence of the actuation signal for a set period of time. This system is monostable in that only the "on" signal or the absence of that signal causes the furnace to function. It contains no measures to filter out extraneous radiation that may hold the system in an unauthorized energized state. As the signal is merely a pulse, extraneous radiation in the form of RF pulses from a variety of sources may interfere with the operation.

The present invention is an energy management system for the homeowner that is inexpensive, easy to install and operate and provides a substantial savings in energy. It may be installed in new construction but for the most part, it is designed to be used in homes already containing a centrally located, wall-mounted thermostat or other energy level indicator. The method of achieving the desired energy savings includes shutting off energy transfer ducts to unwanted areas of the home and then utilizing a novel portable thermostat to take over control of the systems and achieve desired room temperature while holding the wall-mounted thermostat in a passive condition. Both the novel apparatus and method of using it will now provide a substantial reduction in energy consumption, while maintaining a comfortable environment for the user, commensurate with savings achieved heretofore only in the commercial community. Primary among the novel features of this invention are a coded information train, to eliminate erroneous responses due to transient radiation, a fail-safe override mechanism to phase in centralized temperature control or move to system shut-down in event of coded information pulse lapse and bistable transmission control to provide sound, accurate programming that is free from outside interference.

SUMMARY OF THE INVENTION

It is therefore the primary object of this invention to provide energy level control for interior environmental energy systems in a remote area within a structure. Further objects of this invention include an energy level control means and method of using that is operative in an environment already subject to extant control by other energy level sensing mechanism; a control that involves codified information radiation to eliminate false response to transient radiation and a fail-safe, cut-out mechanism to establish full system safety from intrasystem failure or exterior catastrophies.

These and other objects will become more apparent by reading the Description of the Preferred Embodiment in conjunction with the drawings appended hereto. The scope of protection sought by the inventor can be determined from a fair reading of the claims that conclude this Specification.

DESCRIPTION OF THE PREFERRED EMBODIMENT

Figure 1:
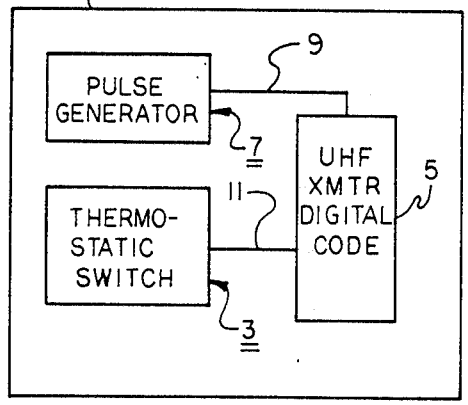
FIG. 1 shows one embodiment of the portable theremostat of this invention.
Figure 2:
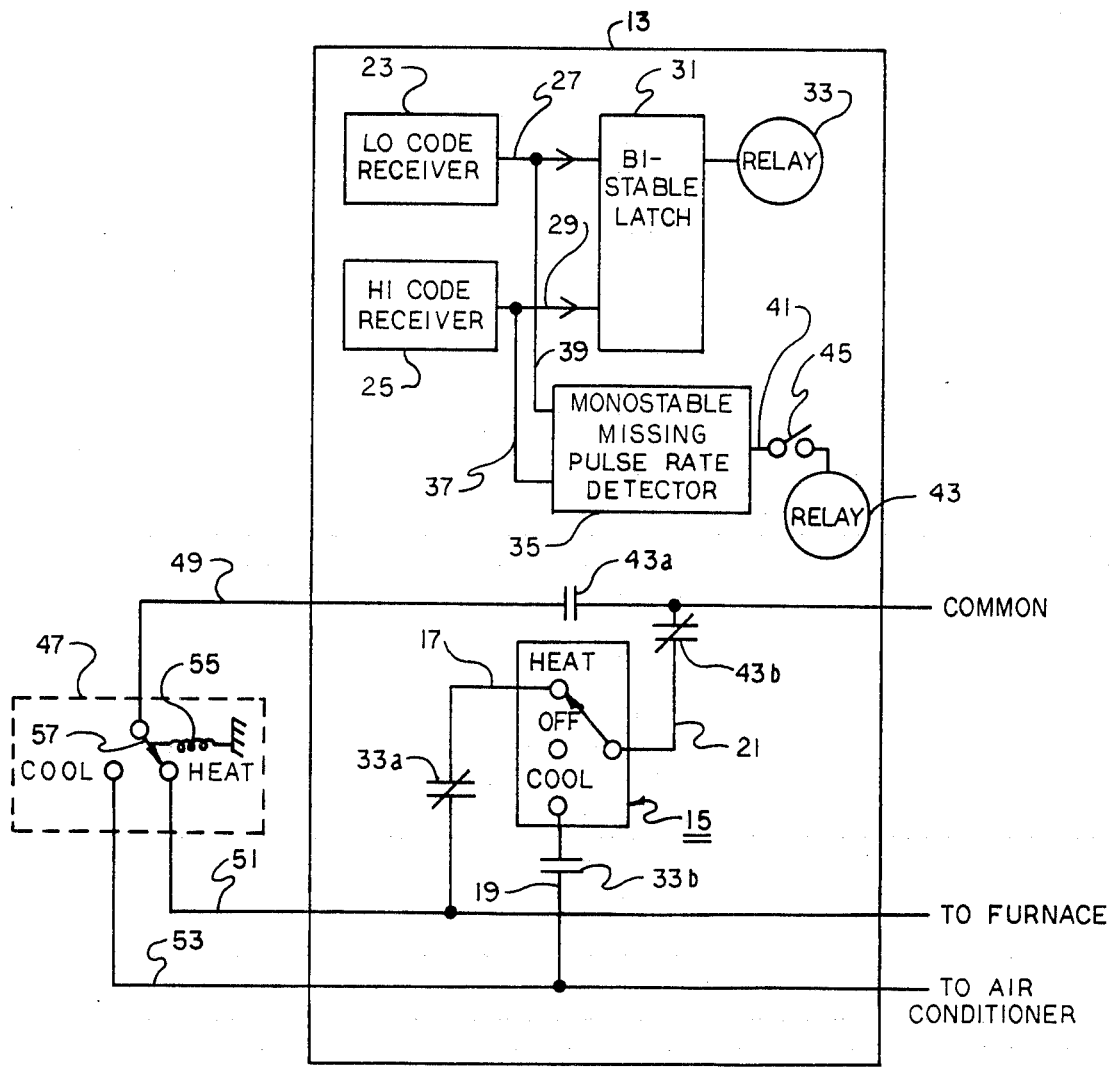
FIG. 2 shows one embodiment of the actuator unit of this invention.

In the drawing is shown in block diagram style a portable thermostat 1 of this invention comprising three basic functions.

The first function of portable thermostat 1 is a means 3 for sensing the ambient temperature, or other controlled variable, departure from a preselected value in the remote area to be controlled. Thermostat devices based upon bimetallic function will usually serve the purpose as long as the function includes an electrical contact that either closes upon temperature departure and opens upon re-establishment at the pre-selected value or vice versa. Readout and adjustment functions are also desirable to enable the operator to observe the current temperature and pre-select a new value.

The second function of thermostat 1 is an electromagnetic transmitter 5. Transmitter 5 operates in the 300 mHz range with an output of less than 100 milliwatts. This is sufficient to have the information reach through walls and other barriers to the remote energy converters, e.g. the furnace, air conditioner and the like. The radiation is pulsed for the reasons of energy conservation, to eliminate a steady stream of fixed frequency radiation that could affect nearby appliances and to establish the fail-safe attributes of the overall system, to be described more fully later.

Finally, there is provided a means 7 to periodically trigger transmitter 5, through lead 9 to emit a stream or series of spaced apart signal pulses in response to information from temperature sensing means 3, via lead 11, when the ambient temperature in the area of portable thermostat 1 departs from the pre-selected value, through a code preset at transmitter 5. The pulse rate should be of the order of fractions of a minute, such as every 30 seconds or so to reduce load on the power source. The pulse code is to avoid interference from transient RF radiation of all forms, i.e., amplitude and frequency modulated as well as pulse train oriented and thus insure the integrity of the control. At present, there exists hardware that contains various codes numbering into the hundreds so that the likelihood of encountering a similar code in operation is quite remote. While not shown, pulse generator 7 may be battery powered or have the ability to be plugged into house current lines: either is operative and fully contemplated herein.

The overall design of portable thermostat 1 may vary depending upon whether it is battery powered or for "plug-in" power and further whether it is for temporary wall mounting or for resting on a level surface. The basic requirement is that it comprises the basic three functions previously described herein.

Next is shown an actuator unit 13 that is attached to, mounted on or otherwise placed into communication with the environmental energy systems corresponding to those energy loops established for control. Unit 13 comprises a means 15 for selecting a specific environmental energy system such as a heating loop (via lead 17), a cooling loop (via lead 19), etc. While numerous devices may accomplish this function, such as push button switches, tab insertion switches, and the like, it is preferred that means 13 take the form of a simple single pole, multiple-throw electrical switch connected to the common control line via lead 21. Although only heating and cooling loops are illustrated, other energy loops may be added or substituted such as humidity, dust dispersion and anion particle concentration. The term "loop" is used to indicate a complete power-environment function-control network as opposed to recitation of each unit individually.

Said unit 13 further includes a pair of pulse code receivers 23 and 25. Receiver 23 is dubbed a "Lo-code" receiver corresponding to a signal for a temperature less than the desired temperature. Each of these receivers is precoded to receive only the appropriate code pulse trains as encoded in transmitter 5. There will be two acceptable coded pulse trains, the Lo-code corresponding to an "on" command that orders the energizing of the energy unit, furnace, etc., and a separate Hi-code corresponding to an "off" command that orders the unit to de-energize. The last command received by the receiver will be held until the next transmission. This is termed "latching" and having the receiver being capable of remaining stabilized in one of two positions ("on" and "off") is termed "bi-stable latching."

Each of the code receivers 23 and 25 is connected via separate lead lines 27 and 29 to a bi-stable latch means 31 and relay 33 for relaying said coded signal pulses to the appropriate energy loop. For instance, when the temperature in the room where portable thermostat 1 is located descends from the preselected value set by the operator, pulse transmitter 5 is triggered by pulse generator 7 to transmit a coded pulse train of information. This pulse train is received by Lo-code receiver 23 and a command is transmitted to relay 33. If the heating loop is selected by means 15, relay 33 is connected to the heat cycle circuit of the furnace and will order the furnace to begin to deliver heat into the energy distribution ductwork in the house. Upon re-establishment of the pre-selected temperature value in thermostat 1, a different coded pulse train is transmitted from transmitter 5 to Hi-code receiver 25 ordering the furnace to stop heating. If the cooling loop is selected, Hi-code receiver 25 will cause the air conditioner to turn on and Lo-code receiver 23 will cause it to turn off.

To ensure the controls on the energy loop remain activated or latched in the proper mode, i.e. "on" or "off", transmitter 5 transmits a command pulse train in the proper code each fraction of a minute (e.g., every 30 seconds or so). A missing pulse rate detector 35 is provided which is connected to receivers 23 and 25 by lines 37 and 39 respectively and then connected by lead line 41 to relay 43. Detector 35 is programmed to receive all signal pulses of the codes applicable to the specific energy loop commands, e.g., heating and cooling. As long as these pulses are received in their spaced intervals as aforesaid, detector 35 holds relay 43 in a closed or conducting mode to allow the various commands to reach the specific energy units. Upon the failure to receive an incoming signal pulse over a multiple of the pulse spaces, such as for 230 seconds, relay 43 is unlatched into an "off" mode and opens to disable or remove the temperature control of this invention from the control system. If this invention is installed as new construction, i.e., in the absence of a backup system, then the system will merely shut down. Should this system be installed in addition to the standard or conventional wall-mounted thermostat, then missing pulse rate detector 35 may be programmed to have relay 43 disconnect this inventive system and reconnect into the conventional thermostat as a fail-safe type of backup system. A switch 45 may be optionally provided in transfer line 41 to effect a transfer of function to the conventional thermostat.

A conventional, mounted thermostat is shown in dotted outline at 47 from which three lines traditionally emanate, namely a common line 49, a furnace line 51 and an air conditioner line 53. A temperature-actuated bimetallic spring 55 actuates a switch 57 to make and break a continuous circuit between common line 49 and either furnace line 51 or air conditioner line 53; shown here is furnace line 51 in control. Relay 33 is connected in part to furnace control line 51 (shown as relay 33a) in line 17 and connected in part to condition control line 53 (shown as relay 33b) in line 19. Relay 43 is connected in part into common line 49 (shown as relay 43a) and in part to means 15 (shown as relay 43b) through input line 21.

During operation of this invention, as is shown in the drawing, relay 43a is normally open to shut wall mounted thermostat 47 off from control and relay 43b is closed to allow control from portable thermostat 1. Also as is shown, the furnace heat loop has been chosen by switching means 15 to the heat loop. Thereafter, "Hi" and "Lo" ("on" and "off") coded pulses will be transmitted from thermostat 1, received by receivers 23 and 25, fed into latch 31 to relay 33 to relay 33a for turning "on" and "off" the furnace (relay 33 is shown in the "on" or closed position). Upon failure of either a "Hi" or "Lo" coded pulse to be received by detector 35, over a period of time as aforesaid, relay 43 will cause relay 43b to open (for new construction) and shut off the furnace or cause relay 43b to open and relay 43a to close (for retrofit into existing housing) and reconnect wall mounted thermostat 47 to the furnace control loop. The same overall operation occurs when the air condition loop is chosen.

To effectively utilize the aforesaid system, one undertakes the steps of shutting off energy transmission ducts (heating ducts) to the areas of the structure that are not to be used, opening the ducts into areas that are to be controlled, locating portable thermostat 1 in the area to be used, selecting a temperature (or other energy variable) desired to be achieved in said area, disengaging the conventional wall-mounted thermostat and energizing the device of this invention to begin remote control of the chosen energy loop.

I claim:

1. Energy control for interior environmental energy system comprising:
   (a) a portable energy level indicator for location in area of desired energy control comprising:
      (1) means for sensing area energy level departure from a preselected value;
      (2) an electromagnetic pulse transmitter;
      (3) means for triggering said pulse transmitter to emit a series of spaced apart signal pulses in response to action of said area temperature sensing means when the energy level departs from said preselected value through a code preset for the selected energy system; and,
   (b) an actuator unit in communication with the environmental energy system comprising:
      (1) means for selecting specific energy system;
      (2) pulse code receivers corresponding to each specific energy system adapted to receive the appropriate electromagnetic signal pulses;
      (3) means for relaying said coded signal pulses in bi-stable latched mode to the appropriate specific energy system to bring area energy level back to said pre-selected level; and,
      (4) a missing pulse rate detector, retained in a first passive mode, overriding other energy control units during exposure to any specific energy system coded signal pulses, and translated to a second mode by an absence of said signal pulse for a preselected multiple of pulse intervals.

2. The control of claim 1 including means for interrupting energy input into areas of the interior not to be subject to energy level control.

3. The control of claim 1 wherein said means for selecting specific energy system comprises a switch, for choosing a heating cycle or a cooling cycle by connecting said pulse receiver to a relay corresponding to the desired cycle.

4. The energy control of claim 1, wherein said second mode, to which said actuator is translated, comprises an open circuit resulting in complete shutdown of the system.

5. The energy control of claim 1, wherein said second mode, to which said actuator is translated, comprises an independent standby control unit.

6. The method of providing highly efficient environmental energy control in remote areas of a structure comprising the steps of:
   (a) shutting off energy transmission ducts to areas of the structure not to be used;
   (b) opening energy transmission ducts into areas of the structure to be controlled;
   (c) locating a portable thermostat in said area of the structure to be controlled, said thermostat comprising:
      (1) means for sensing area energy level departure from a preselected value;
      (2) an electromagnetic pulse transmitter;
      (3) means for triggering said pulse transmitter to emit a series of spaced apart signal pulses in response to action of said area temperature sensing means when the energy level departs from said preselected value through a code preset for the selected energy system; and,
   (d) locating an actuator unit in communication with the environmental energy system of the structure, said unit comprising:
      (1) means for selecting specific energy system;
      (2) pulse code receivers corresponding to each specific energy system adapted to receive the appropriate electromagnetic signal pulses;
      (3) means for relaying said coded signal pulses in bi-stable latched mode to the appropriate specific energy system to bring area energy level back to said pre-selected level; and,
      (4) a missing pulse rate detector, retained in a first passive mode, overriding other energy control units during exposure to any specific energy system coded signal pulses, and translated to a second mode by an absence of said signal pulses for a preselected multiple of pulse intervals;
   (e) selecting an energy level desired to be achieved; and,
   (f) energizing said portable energy level indicator and said actuator unit.

7. The energy control of claim 6, wherein said second mode, to which said actuator is translated, comprises an open circuit resulting in complete shutdown of the system.

8. The energy control of claim 6, wherein said second mode, to which said actuator is translated, comprises an independent standby control unit.

* * * * *